United States Patent [19] [11] 4,292,711
Becker [45] Oct. 6, 1981

[54] PROCESS FOR THE SIMULTANEOUS FILLING AND TURNING OF A TUBULAR CASING WITH AN OUTSIDE COATING

[75] Inventor: Reinhold Becker, Wiesbaden, Fed. Rep. of Germany

[73] Assignee: Hoechst Aktiengesellschaft, Frankfurt am Main, Fed. Rep. of Germany

[21] Appl. No.: 24,763

[22] Filed: Mar. 28, 1979

[30] Foreign Application Priority Data

Mar. 31, 1978 [DE] Fed. Rep. of Germany ....... 2813847

[51] Int. Cl.³ ...................... A22C 11/02; A22C 13/00
[52] U.S. Cl. .......................................... 17/49; 17/41; 53/576
[58] Field of Search ................... 17/45, 41, 42, 49; 53/576, 581

[56] References Cited

U.S. PATENT DOCUMENTS

| 2,715,903 | 8/1955 | Scholl | 128/157 |
| 3,274,005 | 9/1966 | Alsys | 99/176 |
| 3,892,869 | 7/1975 | Sheridan et al. | 17/49 X |
| 3,894,312 | 7/1975 | McNeill | 17/45 X |
| 4,007,761 | 2/1977 | Beckman | 17/33 X |
| 4,075,737 | 2/1978 | Story | 17/45 |
| 4,162,557 | 7/1979 | Rasmussen | 17/45 |
| 4,164,057 | 8/1979 | Frey et al. | 17/41 X |

FOREIGN PATENT DOCUMENTS

| 1003687 | 1/1977 | Canada | 99/89 |
| 2756683 | 7/1978 | Fed. Rep. of Germany | 17/45 |
| 1060403 | 3/1967 | United Kingdom | 138/103 |

Primary Examiner—Willie G. Abercrombie
Attorney, Agent, or Firm—Schwartz, Jeffery, Schwaab, Mack, Blumenthal & Koch

[57] ABSTRACT

A process for filling a flexible shirred tubular casing having a coating thereon with a filling mass including: deshirring a short end section of the casing by stretching the shirred casing in a longitudinal direction; closing the deshirred section and placing it over a tubular body, wherein a deshirred section is formed on the exterior of the tubular body and in the interior of the shirred casing by deshirring a portion of the casing and substantially simultaneously inverting the deshirred section substantially 180°; filling the casing by continuously deshirring the shirred section in accordance with the quantity of filling mass discharged, and simultaneously, continuously inverting the deshirred section 180°.

7 Claims, 9 Drawing Figures

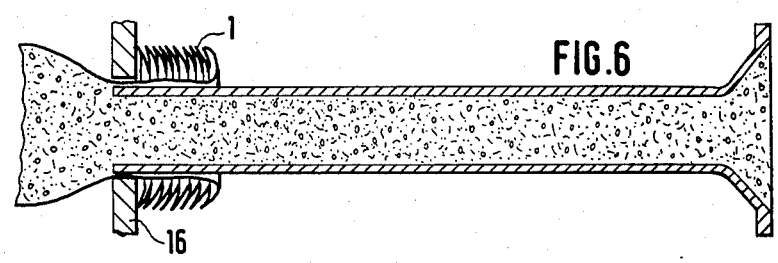
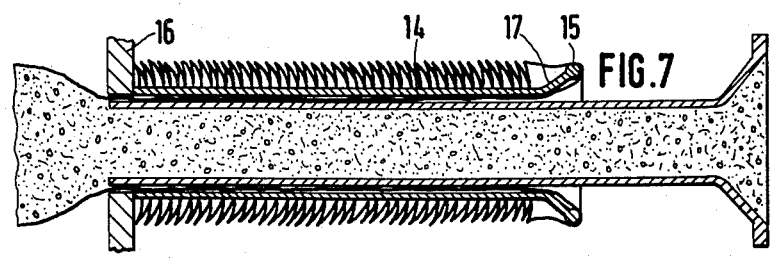
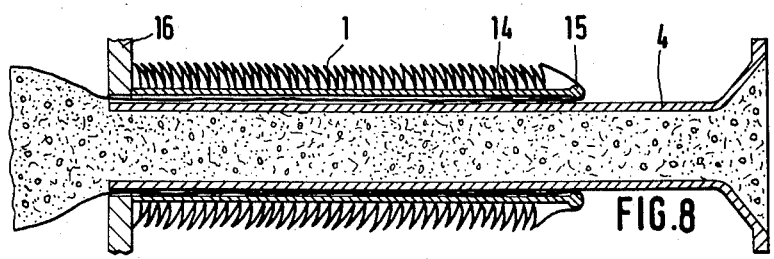
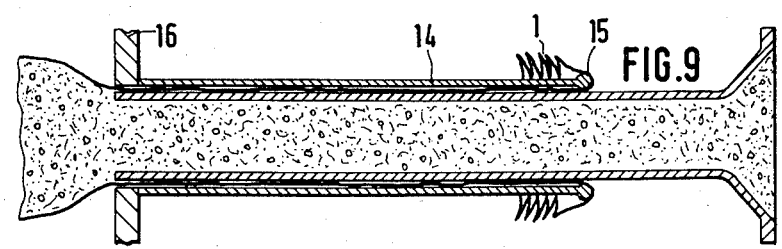

PROCESS FOR THE SIMULTANEOUS FILLING AND TURNING OF A TUBULAR CASING WITH AN OUTSIDE COATING

The present invention relates to a process for simultaneously filling and turning longitudinally shirred tubular casings having an outside coating.

It is an object of the present invention to provide a process for filling a tubular casting carrying an outside coating, the casing being in the form of a hollow stick formed by longitudinally shirring the tubular casing. The casing, especially for use as an artificial sausage casing, is filled with a mass, for example, a sausage mixture, and is simultaneously turned in a manner such that the filling mass adjoins the coating formerly on the outside of the tubular casing.

The process according to the invention is applied with advantage in all cases where, depending on the characteristics of the filling mass, such as one having the characteristics of a sausage mixture, it is desired for the sausage mixture to be either in contact with the coating on the tubular casing or with the uncoated surface of the sausage casing. If the sausage manufacturer wishes to produce sausages wherein the artificial sausage casing carries a coating on its outside, the stick formed from a tubular casing with an outside coating is used in the conventional manner; otherwise, the process according to the present invention is utilized.

The process according to the invention is used with particular advantage in the manufacture of sausages, tubular artificial sausage casing consisting of cellulose hydrate, especially fiber-reinforced cellulose hydrate casings, which carry on their original outer surface a coating of a synthetic polymer, e.g. a vinylidene chloride copolymer coating, being preferred. The tubular casing is longitudinally shirred and forms a hollow stick. This means that the outer surface of the hollow stick consists of the vinylidene chloride copolymer coating.

The object of the present invention is achieved by a process for the simultaneous filling with a filling mass and turning of a flexible casing with an outside coating, wherein a hollow stick consisting of a shirred tubular casing is used, the process comprising: deshirring a short end section of the hollow stick by stretching the section in the longitudinal direction; closing the deshirred section end of the tubular casing which forms an integral part of the hollow stick; pushing the hollow stick with the deshirred, straight end section with its closed end first onto a straight, dimensionally stable tubular body in a manner such that a deshirred tube section is formed in the interior of the hollow stick and that the tubular casing of which the hollow stick is formed is further deshirred and simultaneously inverted by 180°; and finally continuously forcing a filling mass through the interior of the hollow stick into the deshirred tube section closed at one end, in the direction of the closed end, so that the shirred tubular casing forming the hollow stick is continuously further deshirred in accordance with the quantity of filling mass discharged and the deshirred section of the tubular casing is simultaneously continuously inverted by 180°.

According to one embodiment of the invention the process is carried out in a manner such that the continuous deshirring and turning of the tubular casing, determined by the quantity of filling mass discharged, takes place under conditions which prevent contact between the deshirred tube section in the interior of the hollow stick and the inner surface of the hollow stick. In this embodiment of the inventive process frictional contact between the deshirred tube section in the interior of the hollow stick and the inner surface of the hollow stick is prevented.

The terms (1) "turning the deshirred tubular section 180°" and (2) "inverting the tube 180°" in a manner such that, after execution of the inverting or turning operation, the original outer suface of the tube which also forms the outer surface of the hollow stick forms the inside surface of the deshirred, inverted tube shall have the same meaning.

By the continuous deshirring and inverting of the tube during operation of the inventive process, which is caused by the continuous introduction of filling mass into the deshirred tube section, the filling mass adjoins the original outer surface of the tube.

The performance of the inventive process is described by way of example as follows:

A hollow stick consisting of a shirred tubular casing is produced in known manner and by means of known shirring devices, by longitudinally shirring against an abutment a tubular casing of sufficient length which carries on its outer surface a coating of synthetic chemical material, e.g. a tubular casing of fiber-reinforced cellulose hydrate coated on its outer surface with a coating based on a vinylidene chloride copolymer.

A section of the hollow stick near one of its ends is converted into a deshirred tube section by longitudinally stretching the shirred tubular casing of which it is formed with partial deshirring of the casing.

The length of the end section of the hollow stick which is to be deshirred is selected so that, after deshirring, a deshirred tube section is formed which is about 100 to 150 mm long. As compared with the total length of the hollow stick, the deshirred tube section is relatively short. The end of the hollow stick which is not subjected to a partial deshirring, will be designated in the following as the "other end".

The deshirred tube section is then closed near its open end. The tube may be closed e.g., by knotting, twisting, gluing or tying, or by the application of a clip.

The hollow stick with the deshirred tube section closed at the end is then pushed—closed end of the deshirred tube section forward—onto or over a straight, dimensionally stable tubular body, which may be, e.g., the spout of a sausage filling machine. For pushing the hollow stick on or over the dimensionally stable tubular body, the hollow stick and the tubular body are so arranged with respect to each other that their longitudinal axes are in alignment with each other. The hollow stick is pushed onto the tubular body until the entire inner surface of the hollow stick adjoins the surface of the tubular body.

The hollow stick is so dimensioned that the diameter of its cavity is larger than the outside diameter of the tubular body and that its length about equals the length of the tubular body, but does not exceed it.

When pushing the hollow stick on or over the tubular body, the deshirred tube section with the closed end is first introduced in the interior space of the hollow stick and at the same time is inverted. Then, as the hollow stick is further advanced on the tubular body, the closed end is pushed through the interior of the hollow stick in the direction of the other end thereof.

As the deshirred end of the stick is advanced, the hollow stick is automatically further deshirred, and, at the same time, the deshirred tube section is inverted 180°. By this operation, a deshirred tube section closed at one end is formed in the interior of the hollow stick. The outer surface of the deshirred tube section extends adjacent to the inner surface of the hollow stick, and the inner surface of the deshirred section of tube adjoins the outer surface of the tubular body.

The closed end of the deshirred tube section obstructs the opening of the tubular body, i.e., the orifice of the filling spout. Advantageously, the hollow stick is pushed onto the tubular body until the closure of the deshirred tube section approaches the orifice at the other end of the hollow stick.

Then the filling mass, e.g. a sausage mixture, is continuously forced through the filling spout towards the closed end of the deshirred tube section. By the pressure of the filling mass, which acts upon the deshirred tube section with the closed end in the direction of the longitudinal axis of the hollow stick, the hollow stick is continuously deshirred in accordance with the quantity of filling mass discharged and at the same time turned inside out by 180°.

The filling mass is forced into the deshirred section of the hollow stick until the tubular casing forming the hollow stick has been completely deshirred. At the same time, the tubular casing is inverted over its entire length in a manner such that, after practicing the inventive process, the original outside layer of the tubular casing forms the inner surface of the inverted casing, and thus adjoins the filling mass present in the interior of the tubular casing.

If desired, the hollow stick may be pushed by hand onto the tubular body, e.g. the filling spout of a sausage filling machine. Advantageously, the hollow stick is pushed so far over the filling spout that a sufficiently long section of the deshirred tubular casing lies on the spout, outside the interior of the hollow stick.

In order to prevent an undesirable penetration of the sausage mixture into the space between the surface of the filling spout and the deshirred tube section according to one embodiment of the inventive process, the gap between the outer surface of the filling spout and the casing is so reduced at the end of the filling spout that this undesirable effect is avoided, although it is still possible for the casing to slide over the surface of the filling spout. For pressing the tubular casing upon the filling spout, a device is used in the form of a ring-shaped body which is arranged near the end of the filling spout, and so closely surrounds the filling spout that only an adequately dimensioned annular slot remains.

Devices of this type are known under the designation of "tube brake". The tube brake at the end of the filling spout has also the effect of securing the hollow stick against displacement in the direction of the end of the filling spout.

The tube brake is fastened around the filling spout and the tubular casing thus surrounding it after the hollow stick has been pushed so far over the filling spout that a portion of the spout, surrounded by the deshirred tubular casing, projects from the interior of the hollow stick.

In a preferred version of the invention, the process is performed in such a manner that first a rigid, hollow-cylindrical supporting element is inserted into the interior of the hollow stick of shirred tubular casing. The length of the hollow-cylindrical supporting element preferably corresponds to the length of the hollow stick, and the outside diameter of the supporting element is slightly smaller than the inside diameter of the hollow stick. The length of the hollow stick is at least equal to the length of the tubular body (filling spout). If the supporting element comprises a funnel-shaped end, the length of the cylindrical portion of the supporting element corresponds at least to the length of the hollow stick.

Then one end of the hollow stick is deshirred to such an extent that the deshirred tube section thus formed sufficiently projects beyond the end of the supporting element next to it. The deshirred section of the tube is then closed. The hollow-cylindrical supporting element with the hollow stick arranged thereon is then pushed—with the closure of the deshirred tube section first—on and over a straight dimensionally stable tubular body, e.g. the filling spout of a sausage filling machine. For this pushing operation, the hollow-cylindrical supporting element and the tubular body are arranged in such a manner that their longitudinal axes are in alignment with each other.

In this manner, an arrangement is achieved wherein the filling spout is surrounded by the supporting element. Between the inside surface of the supporting element and the outside surface of the filling spout a deshirred section of the tubular casing is arranged which covers the orifice of the filling spout.

Then a filling mass, e.g. a sausage mixture, is forced into the deshirred section of the tube within the interior of the hollow stick, towards the closure of the tube section; in this manner, the deshirred section of the tube present between the filling spout and the supporting element is advanced in the longitudinal direction, i.e. in the direction in which the filling mass is introduced. At the same time, the stick is further deshirred, and the deshirred section of the tube is turned inside out. During this operation, the inverted, deshirred tube section is not in frictional contact with the inner surface of the hollow stick—which steadily becomes shorter by the continuous deshirring—but contacts the inner surface of the supporting element and the outer surface of the filling spout.

When performing the inventive process in this preferred version, the frictional force acting upon the deshirred tube section thus remains constant during the entire operation, independent of the length of the hollow stick.

If a hollow-cylindrical supporting element is arranged in the interior of the hollow stick, the term "interior of the hollow stick" shall mean the free space of the cylindrical supporting element within the hollow stick.

This preferred version of the inventive process has the following advantages:

It is frequently desired that the tubular casing more or less expands during filling with the filling mass. In order to achieve this effect and to avoid penetration of sausage meat between the filling spout and the deshirred section of the tubular casing, the above mentioned "tube brakes" are applied. When a tubular casing shirred to form a hollow stick is filled in accordance with the process of the present invention, the friction between the deshirred section of the tubular casing and the inner surface of the hollow stick produces a further braking force.

This braking force is not constant, however, but steadily decreases during the filling operation, as the hollow stick is worked up, i.e. continuously shortened, by continuous deshirring.

In the case of easily expandable casings this may cause undesirable changes in the size of the filled casings, i.e. relatively large sizes at the beginning and smaller sizes at the end of the filling operation. To avoid this drawback, the present version of the inventive process is applied. In this process, the frictional force acting upon the deshirred section of the tube present between the hollow-cylindrical body and the tubular body remains constant because the length of the supporting element is constant.

Due to the presence of the supporting element in the interior of the hollow stick, the size of the filled casings remains constant during the entire filling operation, i.e. until the entire length of tube forming the hollow stick has been deshirred, turned, and filled, even if the tubular casing is highly expandable or the tube brake is only slightly tightened.

At the end over which the deshirred section of tube is inverted, the hollow cylindrical body is advantageously bulged out and rounded off in order to facilitate the turning operation.

According to an advantageous embodiment of this preferred version of the inventive process, a hollow-cylindrical supporting element is used in which one end is enlarged in a funnel-shaped manner.

According to this embodiment, the hollow cylindrical body with the conically enlarged end is pushed, with its cylindrical portion foremost, as a supporting element into the interior of the hollow stick. The hollow stick is partially deshirred at the end adjacent to the conical enlargement of the hollow cylindrical body, and the deshirred tube section is pulled over the conical portion of the cylindrical body. The deshirred section of the tube is then closed, and finally the hollow cylindrical body is pushed, with its conically enlarged portion first, on and over the filling spout. The further procedure corresponds to that applied when using a hollow-cylindrical body whose cross-section remains constant over its entire length.

The performance of the process according to the invention is illustrated, by way of example, by the attached drawings, wherein:

FIG. 6 shows the process in its final stage, i.e. shortly before complete deshirring of the entire length of the tubular casing from which the hollow stick is formed; and FIGS. 7 to 9 illustrate other embodiments of the inventive process, wherein a direct contact between the deshirred section of the tube and the inner surface of the hollow stick is avoided.

Figure 1:
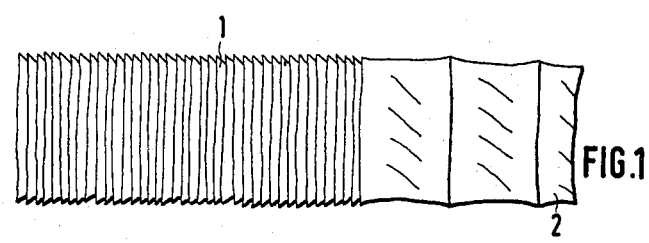
FIG. 1 shows a hollow stick formed by the longitudinal shirring of a tubular casing, the end portion of the hollow stick being partially deshirred and free from shirring folds.

Referring to FIG. 1, a hollow stick 1 formed from the longitudinally shirred tubular casing has a deshirred section 2 at one end thereof produced by partial deshirring of the hollow stick.

Figure 2:
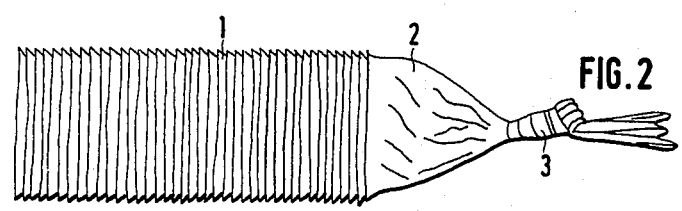
FIG. 2 shows a hollow stick according to FIG. 1, wherein the end of the deshirred tube section is closed by a knot.

In FIG. 2 a closure of the deshirred section of the tube is illustrated in the form of a knot 3.

Figure 3:
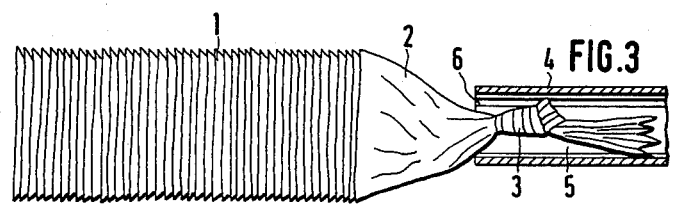
FIG. 3 shows the hollow stick according to FIG. 2, with its deshirred section 2 and knot 3 first, pushed onto a dimensionally stable tubular body.

FIG. 3 illustrates the addition of a tubular body 4. In order to simplify the drawing, only one end of the tubular body is shown. A cavity formed by the tubular body is seen at 5 with an orifice 6, also referred to as the discharge opening (for the filling mass).

Figure 4:
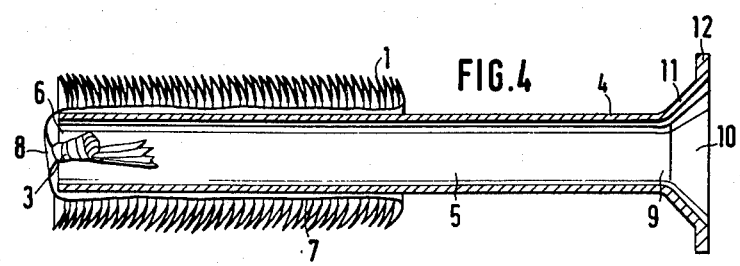
FIG. 4 shows the operational phase which follows that shown in FIG. 3.

In FIG. 4, a deshirred tube section 7 is seen forming an integral part of and consisting of the same tubular casing as the hollow stick 1. Deshirred tube section 7 is produced by partially deshirring the hollow stick while simultaneously inverting the deshirred section of the tubular casing. One surface of the deshirred tube section adjoins the outer surface of the tubular body, while its other surface is in contact with the inside surface of the hollow stick. A portion 8 of the deshirred tube section completely covers the orifice 6 of the tubular body. Another end 9 of the tubular body has an inlet opening 10 (for the filling mass). At end 10 the tubular body includes a funnel-shaped element 11 fastened by a flanged edge 12 to a sausage filling machine (not shown).

Figure 5:
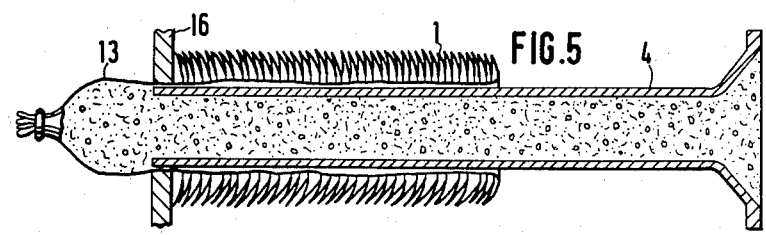
FIG. 5 shows the operational phase after introduction of the sausage mixture into the deshirred tube section within the interior of the hollow stick; at the stage shown, the formerly made knot 3 having been severed before the sausage mixture was introduced and replaced by a conventional clip.

FIG. 5 shows the operational phase immediately following the introduction of the filling mass through the filling spout in the direction of the closed end of the deshirred tube casing. Numeral 13 designates the tubular casing filled with the filling mass. The layer which originally formed the outer surface of the casing, e.g. a vinylidene chloride copolymer layer, is now seen forming the inner surface of the turned and filled tubular casing which is in immediate contact with the filling mass. A ring-shaped tube brake 16 surrounds the tubular body 4 and deshirred section 7 to press the casing against the filling spout, thus providing only a small annular slot between the filling spout and the casing.

FIG. 6 shows the process in its final stage, i.e. shortly before complete deshirring of the entire length of the tubular casing from which the hollow stick is formed.

In FIGS. 7, 8, and 9 a supporting element 14 in the form of a rigid hollow-cylindrical body is inserted between the shirred and deshirred sections. The supporting element includes a bulged-out, rounded-off end 15, the end being flared outwardly at 17 in FIG. 7.

FIGS. 8 and 9 show the supporting element in place, and the casing in initial and advanced stages of filling, respectively.

Reference is made to the extensive introductory portion of the specification for extensive amplification of the advantages and operation of the elements described hereinabove.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method for filling a flexible shirred tubular casing with a filling mass, comprising the steps of:

(a) providing a flexible shirred tubular casing having an inside surface and an outside surface;

(b) deshirring an end section of the casing by stretching the shirred casing in the longitudinal direction;

(c) closing the deshirred end section of the casing to form a closed end;

(d) placing the shirred tubular casing onto the exterior of a substantially straight, dimensionally stable tubular body in such a way that the closed end of the casing covers the end of the tubular body, the deshirred end section of the casing extends along and surrounds the tubular body with the outside surface of the casing being turned toward the tubular body and the shirred casing is positioned on the portion of the tubular body surrounded by the deshirred end section of the casing;

(e) forcing a filling mass under pressure through the interior of the tubular body into the deshirred end section of the casing in a direction toward the closed end of the casing, to fill the deshirred end section of the casing and force the filled casing off of the tubular body, whereby the shirred section of the casing is simultaneously deshirred and inverted to place its outside surface on the inside; and (f) during said step (e), preventing contact between the deshirred section of the casing and the inside surface of the shirred section of the casing.

2. A method according to claim 1, wherein said step of preventing contact comprises positioning a hollow supporting element over the exterior of the tubular body between the deshirred section and the shirred section, whereby the frictional force acting upon the deshirred casing section remains substantially constant during step (e), independent of the length of the shirred section of casing.

3. A method according to claim 2, wherein said hollow supporting element comprises a rounded-off edge at the end facing away from the outlet of the tubular body.

4. A method according to claim 3, wherein said hollow supporting element comprises a radially enlarged portion at said rounded-off end.

5. A method according to claim 4, wherein said enlarged portion comprises an outwardly flared portion.

6. A method according to claim 1, wherein the outside surface of the shirred casing includes a coating.

7. A method according to claim 1, further comprising the step of applying a braking force to the deshirred casing as it moves off of the tubular body.

* * * * *